No. 696,445. Patented Apr. 1, 1902.
G. R. IBACH.
MACHINE FOR MAKING WOODEN BUTTER DISHES, &c.
(Application filed Jan. 18, 1900.)
(No Model.) 5 Sheets—Sheet 1.
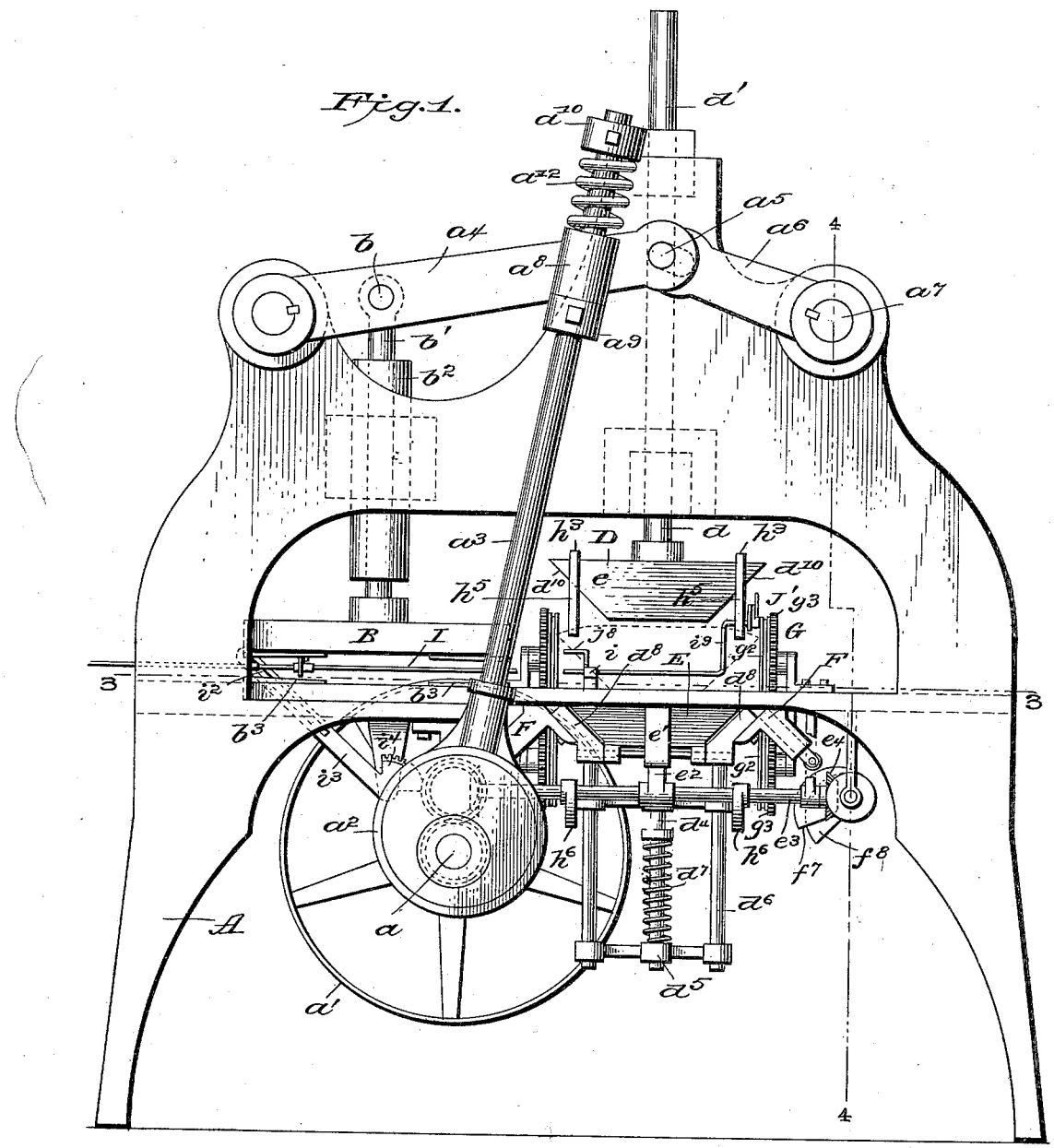
Witnesses
G. S. Elliott
C. F. Duvall
Inventor:
G. R. Ibach,
by W. J. Duvall
Attorney

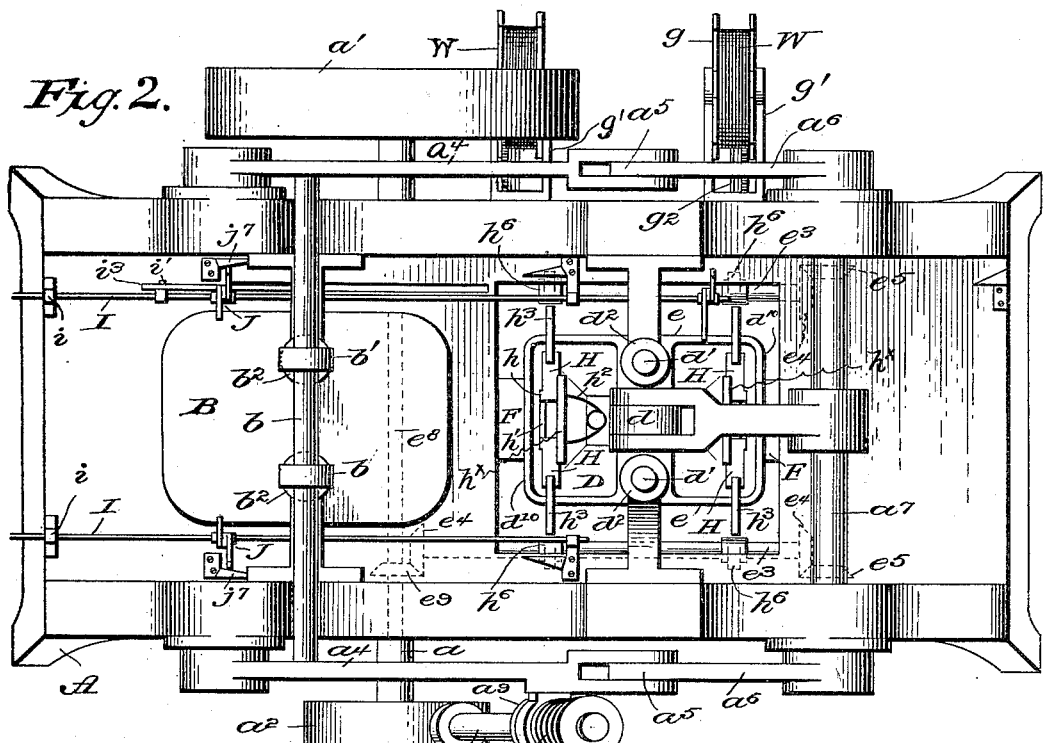
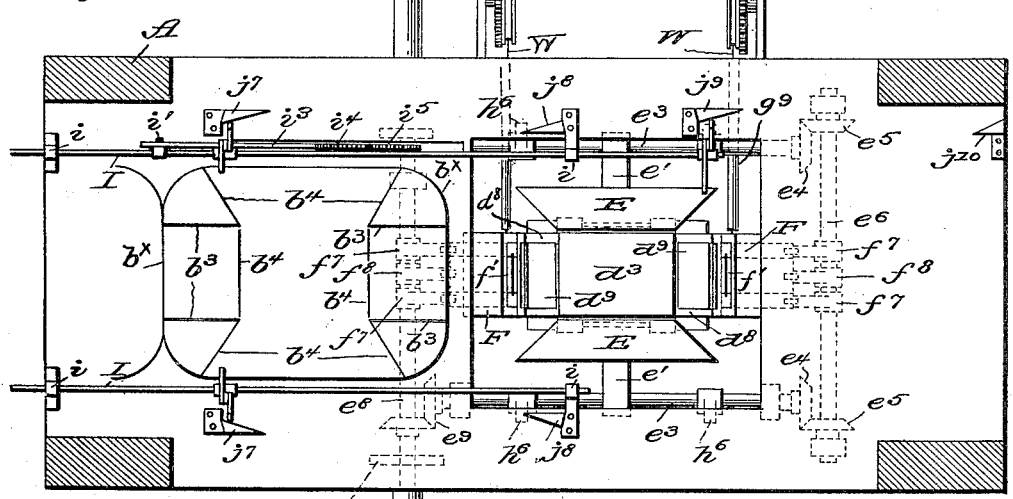

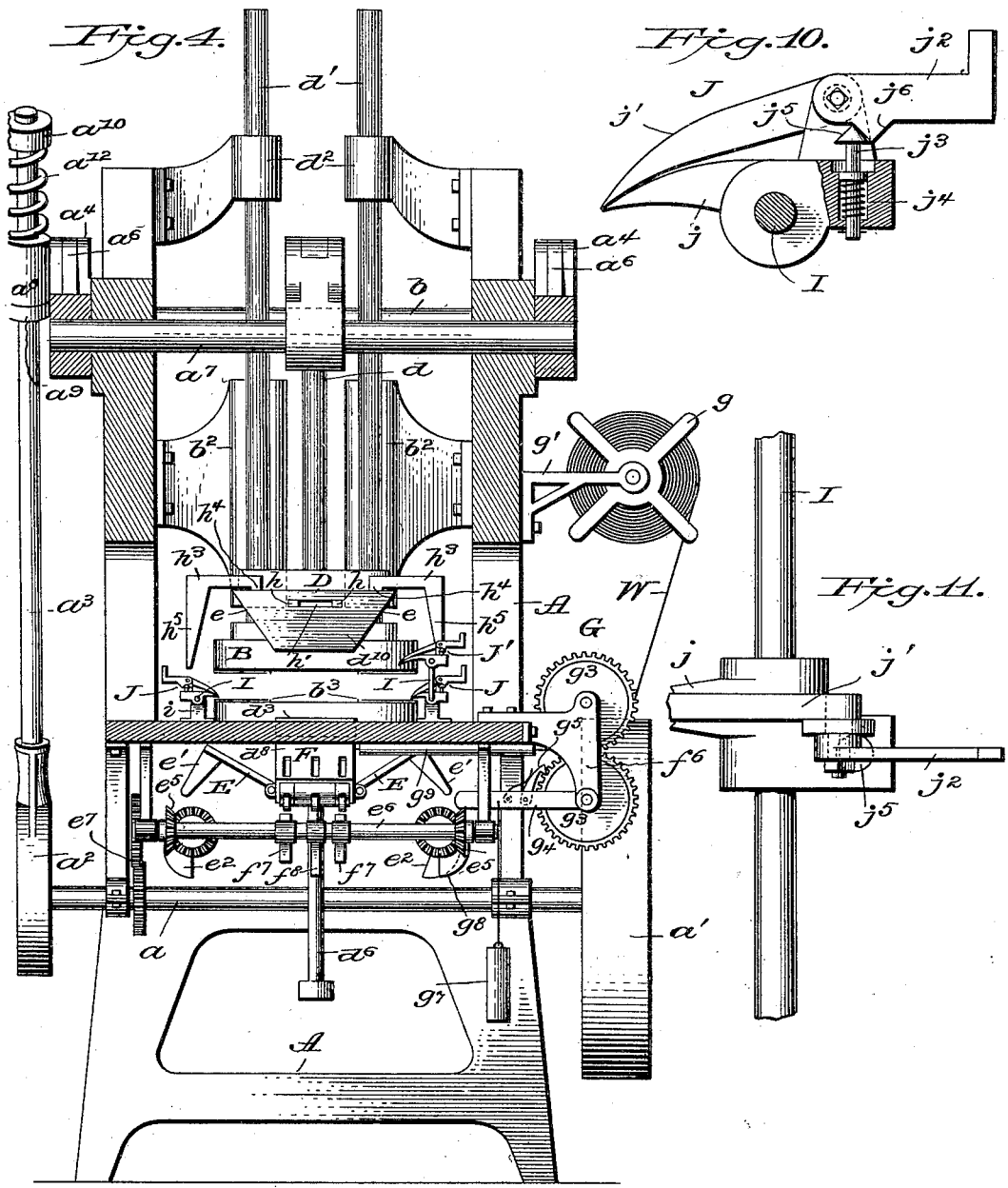

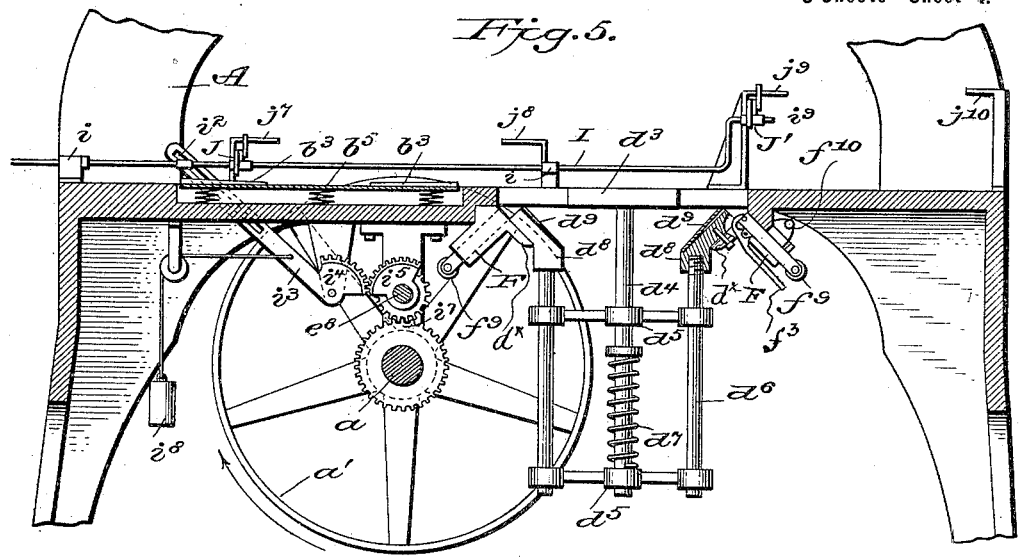
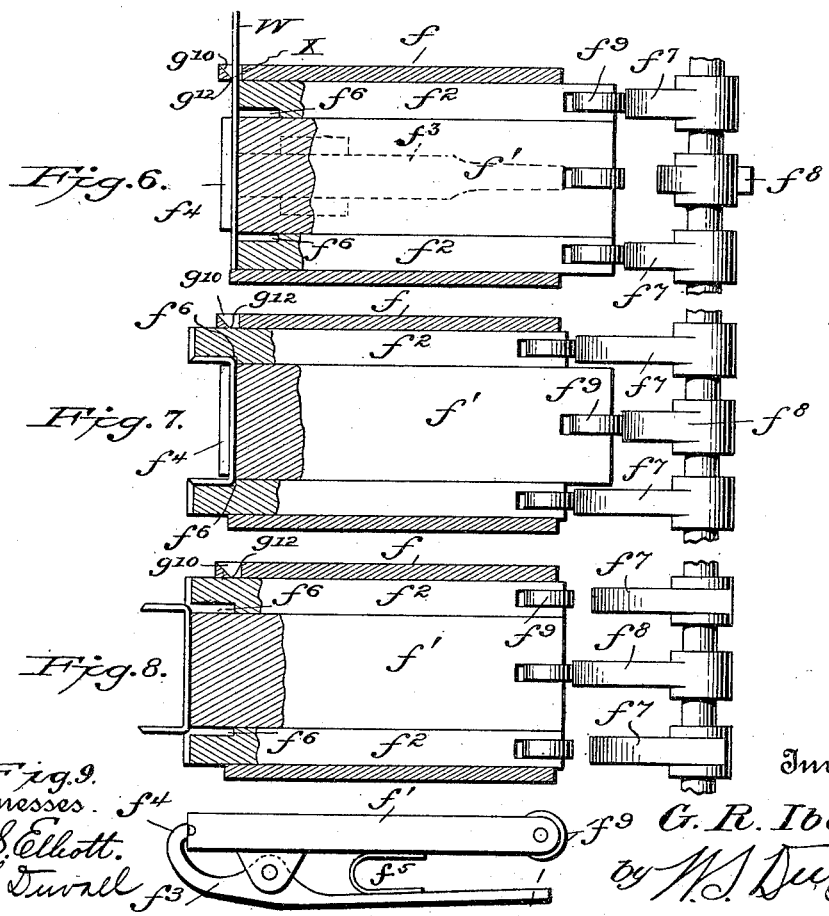

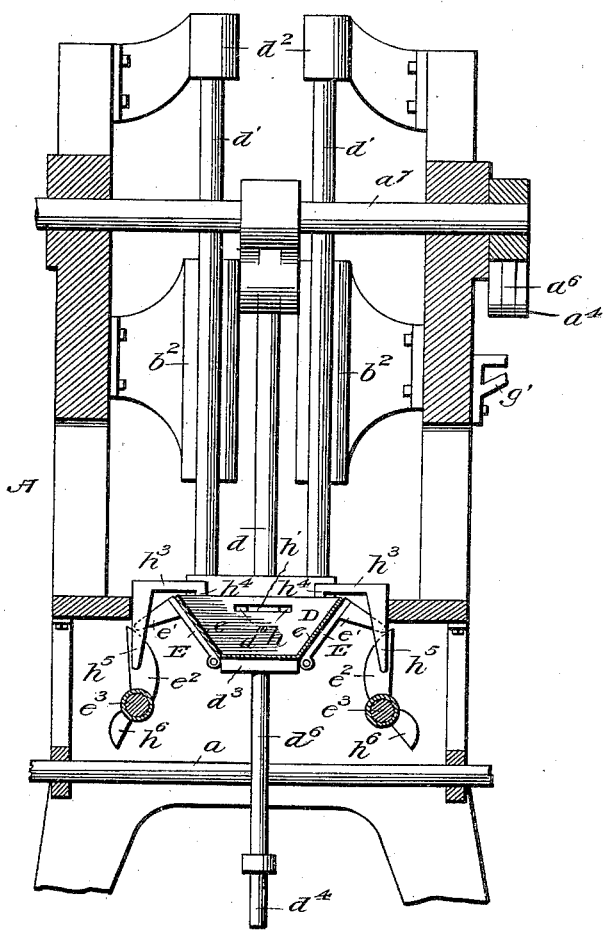
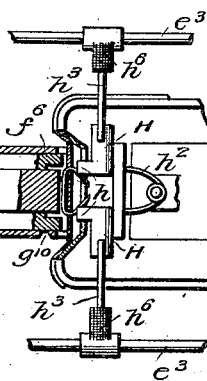

UNITED STATES PATENT OFFICE.

GIDEON R. IBACH, OF BROOKLYN, NEW YORK.

MACHINE FOR MAKING WOODEN BUTTER-DISHES, &c.

SPECIFICATION forming part of Letters Patent No. 696,445, dated April 1, 1902.

Application filed January 18, 1900. Serial No. 1,901. (No model.)

*To all whom it may concern:*

Be it known that I, GIDEON R. IBACH, a citizen of the United States, residing at Brooklyn, in the county of Kings and State of New York, have invented certain new and useful Improvements in Machines for Making Wooden Butter-Dishes, &c.; and I do hereby declare the following to be a full, clear, and exact description of the invention, such as will enable others skilled in the art to which it appertains to make and use the same.

This invention relates to certain new and useful improvements in machines for making wooden dishes, baskets, and the like; and it has for its object the production of a simple and efficient machine of this character in which the blanks are readily and quickly cut from thin sheets of veneering or the like and by a further operation molded or shaped in the desired form.

A further object is to produce means for automatically feeding said veneering strips to the blank-forming mechanism, transferring the latter to the shaping mechanism, and finally delivering the completed article.

A further object is to produce means for automatically feeding a continuous wire, cutting and binding the latter to form staples, and finally forcing the pointed ends of the latter through adjoining portions of the molded or shaped blank.

A further object is to produce means for automatically binding or clenching the ends of said staples.

The invention will be hereinafter fully set forth, and particularly pointed out in the claims.

In the accompanying drawings, Figure 1 is a view in side elevation illustrating my invention. Fig. 2 is a plan view thereof. Fig. 3 is a sectional view on line 3 3, Fig. 1. Fig. 4 is a sectional view on line 4 4, Fig. 1. Fig. 5 is a central longitudinal sectional view. Figs. 6, 7, and 8 are detail views illustrating the staple-forming mechanism. Fig. 9 is a side view of the latter. Figs. 10 and 11 are enlarged detail views of the feeding-clamps. Fig. 12 is a detail sectional view showing the shaping mechanism forming a blank. Fig. 13 is a detail view of the staple driving and clenching mechanism.

Referring to the drawings, A designates a frame or support, in which is mounted a main shaft $a$, having a fly-wheel $a'$ keyed to one end thereof. To the other end of said shaft is keyed an eccentric $a^2$, connected to a rod or pitman $a^3$. On opposite sides of frame A are pivoted levers $a^4$, the free ends of which are united by a pin-and-slot connection $a^5$ to the free ends of levers $a^6$, which are keyed to the opposite ends of a shaft $a^7$, mounted in said frame. The rod or pitman $a^3$ is passed through a sleeve $a^8$, pivotally connected to one of the levers $a^4$, the play of said pitman being limited by collars $a^9 a^{10}$, between which latter and said sleeve is interposed a coil-spring $a^{12}$.

An arm or rod $b$ is mounted between the levers $a^4$, and to the same are pivotally connected the supporting-arms $b'$ of the blank-forming die B. Said arms $b'$ are guided in their up-and-down movement by sleeves $b^2$, secured to frame A. The die B coacts with parallel knives $b^3$, designed to pass entirely through the material acted upon, and scoring-blades $b^4$ and $b^\times$, designed to score the same. The blanks after cutting are disengaged from the knives by a spring-pressed plate $b^5$.

To the shaft $a^7$ is keyed a forked arm or member having pivotal connection with the plunger $d$ of the shaper D, the latter being guided by rods $d'$, working in sleeves $d^2$. The shaper D is an open-top box-like member in the form of an inverted frustum of a pyramid. In its downward movement the shaper engages with the table or platform $d^3$, formed on the upper end of a vertical rod $d^4$, working in guide-sleeves $d^5$, carried by a depending frame $d^8$, removably secured to downwardly-projecting ears $d^\times$ of the main frame A. The rod $d^4$ is normally held elevated by a coil-spring $d^7$, encircling the same. The upper portion of frame $d^6$ is provided with diverging approximately flat heads or enlargements $d^8$, the same serving to support spring-plates $d^9$. Said heads or enlargements serve to bend or turn the ends of the blanks against the ends $d^{10}$ of the shaper D, the plates $d^9$ serving as cushions to relieve the shock when said shaper descends. On opposite sides of frame $d^6$ and at right angles to heads or enlargements $d^8$ are pivoted plates E, which serve to bend the sides of the blanks against the ends $e$ of the former D. Said plates are provided with depending arms or members $e'$, designed to be engaged by cams $e^2$, keyed to shafts $e^3$, mounted on frame A. Said shafts are provided with beveled pinions $e^4$, meshing with similar pinions $e^5$ on shaft $e^6$, which is operated by suitable gearing $e^7$, keyed to a second shaft $e^8$ and operated by the main shaft. Said shaft $e^8$ is mounted on frame A opposite shaft $e^6$, and the same is provided with beveled pinions $e^9$, meshing with similar pinions mounted on shaft $e^3$. The shaper as it descends severs the blank from the veneer strip along the lines scored by knives $b^\times$.

F F designate the staple-formers, mounted in the depending ears $d^\times$ of frame A adjacent each of the heads or enlargements $d^6$. Each of said staple-formers comprises a sleeve $f$, in which is mounted a central driving-plunger $f'$ of a width equal to the desired length of the finished staple, and two bending-plungers $f^2$, arranged on opposite sides of the former. The forward end of each of said plungers is grooved to receive the wire W, the latter being held in place by a pivotally-mounted arm $f^3$, having a curved end $f^4$, normally held in engagement with the forward end of plunger $f'$ by a spring $f^5$. In the inner faces of plungers $f^2$ are formed short grooves $f^6$, leading in from the forward ends thereof. The bending-plungers are moved simultaneously by means of cams $f^7$, keyed to the shafts $e^6 \, e^8$, and plunger $f'$ and pivotally-mounted arm $f^3$ are moved by cams $f^8$, also mounted on said shafts, said cams engaging and operating arms $f^3$ just prior to engaging said plunger, the path of the cam being indicated in dotted lines, Fig. 9. If desired, rollers $f^9$ may be mounted in the ends of said plungers for the purpose of reducing the friction of the cams against the parts. The wire is supplied from a reel $g$, mounted in a bracket $g'$. The feeding mechanism G comprises two suitably-mounted drums $g^2$, between which said wire is passed, each drum having a gear wheel or pinion $g^3$, which intermesh. An arm or lever $g^4$, carrying a spring-pressed pawl $g^5$, is pivoted to bracket $f^6$ and normally held in a lowered position by a weight $g^7$. The lever $g^4$ is raised by a cam $g^8$, keyed to one of the shafts $e^3$. As said cam passes said lever the weight $g^7$ returns the latter to its normal position, the pawl $g^5$ engaging the lowermost gear-wheel $g^8$, thereby feeding the wire a distance equal to the width of the staple-former. The wire passes through a pipe or guide $g^9$ to the staple-former, passing through an eye $g^{10}$ of the casing or sleeve $f$, which is provided with a cutter $g^{12}$. As the movement of the wire is stopped the plungers $f^2$ are moved forward by their respective cams, cutting the wire at X and bending the ends of the severed portion around the edges of curved end $f^4$ of arm $f^3$, forming the staple, as shown in Fig. 7. This operation is completed simultaneously with the bending of the sides and ends of the dish or basket, whereupon the plunger $f'$ is moved forward by its cam forcing the staple through the wood. The plungers are returned to their normal position by springs $f^{10}$.

The staple-clenching mechanism consists of two sets of oppositely-arranged sliding members H, working in guides $h^\times$ and provided with horizontally-disposed angular ends $h$, projecting through slots $h'$, formed in the ends of the shaper D. These members are normally held separated by a spring $h^2$. The members H are operated by approximately inverted-U-shape members $h^3$, the arms $h^4$ and $h^5$ of which are of different lengths. The arms $h^4$ are connected directly to members H, while the arms $h^5$ depend outside of former D and are designed to be engaged and moved toward each other by cams $h^6$, mounted on shafts $e^3$. These cams are so timed that when the staple is forced through the wood by plunger $f'$ the members H are moved toward each other, engaging the ends of the staples and bending or clenching them, thus completing the article ready for delivery from the machine.

I I designate horizontal rods loosely mounted in bearings $i$ and provided with pins $i'$, working in slots $i^2$ of pivotally-mounted levers $i^3$. Each of said levers is provided with toothed segments $i^4$, meshing with a similar segment $i^5$, keyed to a shaft $e^8$, connected by a suitable gearing $i^7$ to the main shaft. As the segment $i^5$ engages the segment $i^4$ the lever is moved forward, carrying rod I, the same being returned by a weight $i^8$ after the segments become disengaged. The rods I are provided with upturned portions $i^9$ adjacent the shaping mechanism. On each rod I is secured a clamp J, which is provided with a lower stationary jaw $j$, having a curved end. In bearings carried by said lower jaw is pivotally mounted a movable jaw $j'$, provided at its rear end with a vertical extension $j^2$. The jaws are normally held in contact by a spring-pressed rod $j^3$, mounted in a chamber $j^4$ of said stationary jaw, the headed end $j^5$ of said rod bearing against a shoulder $j^6$ of the movable jaw. The extension $j^2$ of each clamp is designed to be engaged by cams $j^7 \, j^8$, secured to table A' of frame A. To one of said rods I is secured an additional clamp J', which is designed to be operated by cams $j^9 \, j^{10}$.

In practice the cam $j^7$ engaging the rear of the extension $j^2$ causes the clamps J to engage the veneering on each side, and as the rods I are moved, under the influence of levers $i^3$, the clamps feed the blank from the blank-forming mechanism to the shaper. This operation of course is so timed as to take place after the blank has been formed by the die B. It will be observed that the entire strip is fed forward by this means, as the blank is not severed from said strip until it reaches the shaper. As the clamps J approach the shaper the front edge of the extension $j^2$ is engaged by cams $j^8$, causing the jaws to separate, releasing the strip, the clamp being then returned to its normal position. As the blank reaches this position the shaper D descends, causing the heads $d^2$ and plates E to fold the sides and ends of the dish or basket against the shaper and along the scored lines of the blank. The blow of the descending shaper acting against the edges of the opening normally filled by the table or platform $d^3$ severs the blank from the web, whereupon the operation just described takes place. The parts are then stapled, as heretofore described, and the completed basket returned to the level of the table A′ by spring $d^7$. By this time the clamp J′, which is secured to upturned portions $i^9$ of rods I, has engaged cam $j^9$, causing the jaws to grasp the completed article, and as the new blank is brought into position said article is carried forward until said clamp is engaged by cam $j^{10}$, whereupon the completed dish or basket is delivered to any suitable receptacle.

The advantages of my invention are at once apparent to those skilled in the art to which it appertains, and it will be particularly observed that the same is simple and inexpensive in construction and efficient in operation. It will be further noted that the material is automatically fed and delivered and the several parts of the manufactured article are formed and united in a simple and efficient manner.

I claim as my invention—

1. A machine for making wooden dishes and the like, comprising a main frame, pivoted levers mounted therein and having their adjacent ends pivotally connected to each other at their ends, means operated by said levers for automatically cutting the blanks and shaping the same, and means for working said levers, substantially as set forth.

2. A machine for making wooden dishes and the like, comprising a main frame, pivoted levers mounted therein and having their adjacent ends pivotally connected to each other at their ends, means operated by said levers for automatically cutting the blanks and shaping the same, a pitman pivotally connected to one of said levers, and a shaft to which said pitman is connected and means for operating the same, substantially as set forth.

3. A machine for making wooden dishes and the like, comprising a main frame, pivoted levers mounted therein and pivotally connected to each other at their ends, means operated by one set of said levers for automatically cutting the blanks, means operated by the other set of said levers for shaping the said blank, a sleeve pivotally connected to one of said levers, a pitman passed therethrough, means for operating said pitman, and means for limiting the movement of said pitman, substantially as set forth.

4. A machine for making wooden dishes and the like comprising a main frame, a pair of long levers pivoted to one end of said frame, a pair of shorter levers pivoted to the opposite end of said frame, said levers having their adjacent ends pivotally connected to each other, means operated by said levers for respectively cutting and shaping the blanks, and means for operating said levers, substantially as set forth.

5. A machine for making wooden dishes and the like, comprising a main frame, a pair of long levers pivoted to one end of said frame, means operated thereby for cutting the blanks, a pair of shorter levers pivoted to the opposite end of said frame, and having slots formed therein, pins carried by said former levers and working in said slots, means operated by said shorter levers for shaping the blanks, and means for rocking said levers, substantially as set forth.

6. A machine for making wooden dishes and the like, comprising a main frame, a pair of levers pivotally mounted therein, a rod or bar connecting said levers, blank-forming mechanism pivotally supported by said rod or bar, a rock-shaft mounted in said frame, levers keyed thereto and pivotally connected at their ends to said former levers, an arm or member keyed to said rock-shaft, shaping mechanism connected thereto, and means for operating said levers, substantially as set forth.

7. A machine for making wooden dishes and the like, comprising a main frame or table, cutting and scoring knives arranged thereon, a reciprocating blank-forming die coacting with said knives, a pivoted operating-lever therefor, means for operating the latter, a shaper mounted adjacent said die, a pivoted operating-lever therefor said operating-levers having their adjacent ends pivotally connected, means for disengaging the blanks from the knives, and means for automatically transferring the same to said shaper, substantially as set forth.

8. A machine for making wooden dishes and the like, comprising a main frame or table having depending ears, a depending frame secured to said ears, shaping members carried by said depending frame, a reciprocating shaper-die coacting therewith, stapling mechanism also supported in said ears, and means for operating the same, as set forth.

9. A machine for making wooden dishes and the like, comprising a main frame or table having depending ears, a depending frame secured to the latter, shaping members carried by said depending frame, a spring-pressed table or platform carried by said depending frame, a reciprocating shaper-die coacting with said shaping members, stapling mechanism also supported in said ears, and means for operating the same, as set forth.

10. A machine for making wooden dishes and the like, comprising a main frame or table having depending ears, a depending frame secured to the latter, shaping members carried by said depending frame, a vertical rod mounted in said depending frame, a table or platform carried thereby, a coil-spring encircling said rod, a shaper-die coacting with said shaping members and said table, stapling mechanism also supported in said ears, and means for operating the same, as set forth.

11. A machine for making wooden dishes and the like, comprising a main frame or table, a depending frame secured thereto, and provided with diverging heads or enlargements, spring-plates secured to the opposite faces of said heads or enlargements, pivoted plates secured to opposite sides of said depending frame, a shaper-die, and means for operating the same, substantially as set forth.

12. A machine for making wooden dishes and the like, comprising a main frame or table, a depending frame secured thereto and provided with diverging heads or enlargements, diverging plates pivoted to opposite sides of said depending frame and at right angles thereto, means for periodically raising said plates, a shaper-die, and means for operating the same, substantially as set forth.

13. A machine for making wooden dishes and the like, comprising a main frame or table, a depending frame secured thereto and provided with diverging heads or enlargements, plates pivoted to opposite sides of said depending frame and having arms or members projecting therefrom, shafts mounted in said main frame, means for operating the same, cams carried by said shaft designed to engage said arms or members, a shaping-die, and means for operating the same, substantially as set forth.

14. A machine for making wooden dishes and the like, comprising a main frame or table, a depending frame secured thereto and provided with diverging portions, spring-plates secured to said diverging portions, plates pivoted to opposite sides of said depending frame, means for periodically engaging and raising each of said plates, a shaper-die having tapering sides and ends, and means for operating the same, substantially as set forth.

15. A machine for making wooden dishes and the like, comprising a main frame having depending ears, a depending frame secured to said ears and having shaping heads or enlargements, a shaper-die, means for operating the same, sleeves supported in said ears adjacent each of said heads or enlargements, members carried by said sleeves for forming staples, members carried by said sleeves for inserting staples, means for operating said members, and means carried by said shaper-die for clenching said staples, substantially as set forth.

16. A machine for making wooden dishes and the like, comprising a main frame, a depending frame having shaping heads or enlargements, a shaper-die, means for operating the same, sleeves mounted in said main frame adjacent each of said heads or enlargements, each of said sleeves having a driving-plunger and two bending-plungers, means for alternately operating said bending and said driving plungers, means for feeding wire to said plungers, and means carried by said shaping-die for clenching said staples, substantially as set forth.

17. A machine for making wooden dishes and the like, comprising a main frame, a depending frame having shaping heads or enlargements, a shaper-die, means for operating the same, sleeves mounted in said main frame adjacent each of said heads or enlargements, each of said sleeves having two bending-plungers and a central or driving plunger located therebetween, said plungers having their ends grooved, means for holding a staple in said grooves, and means carried by said shaping-die for clenching the staples, substantially as set forth.

18. A machine for making wooden dishes and the like, comprising a main frame, shaping members carried thereby, a shaper-die, means for operating the same, sleeves mounted in said main frame, each of said sleeves having two bending-plungers and a central driving-plunger located therebetween, said plungers being grooved, means for feeding wire to said grooves, a pivoted member bearing against the grooved end of said driving-plunger, means for operating said plungers, and means carried by said shaping-die for clenching the staples, substantially as set forth.

19. A machine for making wooden dishes and the like, comprising a main frame, shaping members carried thereby, a shaper-die, means for operating the same, sleeves mounted in said main frame, each of said sleeves having two bending-plungers and an intermediate driving-plunger, a spring-pressed lever pivoted to each of said sleeves and having a curved end bearing against the end of said driving-plunger, means for feeding wire to said sleeves, means for operating said plungers, and means carried by said shaping-die for clenching the staples, substantially as set forth.

20. A machine for making wooden dishes and the like, comprising a main frame a depending frame secured thereto, shaping members carried by said depending frame, a shaper-die, means for operating the same, sleeves mounted in said main frame, each of said sleeves having two bending-plungers and an intermediate driving-plunger, means for feeding wire to said sleeves, shafts mounted adjacent said sleeves and having cams keyed thereon designed to engage said plungers, means for operating said shafts, and means carried by said shaping-die for clenching the staples, substantially as set forth.

21. A machine for making wooden dishes and the like, comprising a main frame, shaping members carried thereby, a shaper-die, means for operating the same, sleeves mounted in said main frame, each of said sleeves having two bending-plungers and an intermediate driving-plunger, antifriction-rollers mounted in the ends of said plungers, shafts mounted in said frame adjacent said sleeves, means for operating the same, cams secured to said shafts designed to periodically engage said bending-plungers, and cams secured to said shafts at a different angle from said former cams and designed to periodically engage said driving-plunger, and means carried by the shaper-die for clenching the staples, substantially as set forth.

22. A machine for making wooden dishes and the like, comprising a main frame, shaping members carried thereby, a shaper-die having slots in its end walls, means for operating said shaper-die, means for forming and driving staples, sliding clenching members carried by said shaper-die and having angular portions projecting through said slots, guides for said clenching members, and means for operating the same, substantially as set forth.

23. A machine for making wooden dishes and the like, comprising a main frame, shaping members carried thereby, a shaper-die, means for operating the same, means for forming and driving staples, sliding clenching members carried by said shaper-die, and provided with angular portions, guides for the latter, depending arms connected to said clenching members, and means for moving said arms, substantially as set forth.

24. A machine for making wooden dishes and the like, comprising a main frame, shaping members carried thereby, a shaper-die, means for operating the same, means for forming and driving a staple, clenching members carried by said shaper-die, springs for holding the same normally separated, U-shape arms or members connected to said clenching members, and means for moving said U-shape arms or members, substantially as set forth.

25. A machine for making wooden dishes and the like, comprising a main frame, shaping members carried thereby, a shaper-die, means for operating the same, means for forming and driving a staple, clenching members carried by said shaper-die, depending arms connected thereto, shafts mounted in said main frame, means for operating the same, and cams secured to said shaft and designed to engage said depending arms, substantially as set forth.

26. A machine for making wooden dishes and the like, comprising a main frame, shaping members carried thereby, a shaper-die, means for operating the same, means for forming and driving staples, sliding clenching members carried by said shaper-die and having angular portions, guides for said clenching members, springs for holding said angular portions normally separated, and means for moving said members as against the action of said springs, substantially as set forth.

27. A machine for making wooden dishes and the like, comprising a main frame, blank forming and shaping mechanism supported thereby, horizontal rods mounted on said main frame, means for reciprocating the same, clamps secured to said rods said clamps each having an angular extension and stationary cams carried by said frame and arranged to alternately engage the front and rear faces of said angular extensions, substantially as and for the purpose set forth.

28. A machine for making wooden dishes and the like, comprising a main frame, blank forming and shaping mechanism supported thereby, horizontal rods mounted on said main frame, means for reciprocating the same, clamps having downwardly-curved stationary jaws secured to said rods, movable jaws pivoted to said stationary jaws and having forward curved lips and rearward upturned vertical portions, and stationary cams arranged to alternately engage the front and rear faces of said upturned portions, substantially as and for the purpose set forth.

29. A machine for making wooden dishes and the like, comprising a main frame, blank forming and shaping mechanism supported thereby, horizontal rods mounted on said main frame, means for reciprocating the same, clamps having stationary jaws provided with chambers, spring-pressed rods working in said chambers, movable jaws pivotally mounted upon said stationary jaws and engaged by said spring-pressed rods, said movable jaws having angular portions, and stationary cams arranged to alternately engage the opposite faces of said angular portions, substantially as and for the purpose set forth.

30. A machine for making wooden dishes and the like, comprising a main frame, blank forming and shaping mechanism supported thereby, horizontal rods mounted on said main frame, means for reciprocating the same, clamps having stationary jaws secured to said rods and provided with rear chambers, movable jaws pivoted to said stationary jaws and having lower shoulders, spring-pressed rods working in said chambers and having headed ends engaging said shoulders, and means for moving said jaws as against the action of said spring-pressed rods, substantially as set forth.

31. A machine for making wooden dishes and the like, comprising a main frame, blank forming and shaping mechanism supported thereby, horizontal rods mounted on said main frame, means for reciprocating the same, clamps having stationary jaws secured to said rods and provided with rear chambers, movable jaws pivoted to said stationary jaws and having lower shoulders and rearward angular portions, spring-pressed rods working in said chambers and having headed ends engaging said shoulders, and spaced-apart cams arranged to alternately engage the opposite faces of said upturned portions, substantially as and for the purpose set forth.

32. A machine for making wooden dishes and the like, comprising a main frame, blank forming and shaping mechanism supported thereby, horizontal rods mounted on said main frame, means for reciprocating the same, stationary jaws secured to said rods, pivoted jaws carried by said stationary jaws, and having upturned angular portions formed integral therewith, cams designed to engage the front faces of said angular portions, and additional cams designed to engage the rear faces of said angular portions, substantially as set forth.

33. A machine for making wooden dishes and the like, comprising a main frame, blank forming and shaping mechanism supported thereby, horizontal rods mounted on said frame, clamps secured thereto, means for automatically operating said clamps, levers mounted in said frame and provided with toothed segments, a shaft mounted in said frame and carrying segments arranged to intermesh with said former segments, means for operating said shaft, and means for returning said levers to their normal positions, substantially as set forth.

34. A machine for making wooden dishes and the like, comprising a main frame, shaping members carried thereby, a shaper-die, means for operating the same, stapling mechanism carried by said frame, a bracket secured to said frame, feeding-drums mounted in said bracket and provided with intermeshing pinions, a lever pivoted to said bracket, a depending weight secured to said lever, a spring-pressed pawl carried by said lever and engaging one of said pinions, a shaft mounted in said frame, means for operating the same, and a cam carried by said shaft designed to periodically engage one end of said lever, substantially, as set forth.

In testimony whereof I affix my signature in the presence of two witnesses.

GIDEON R. IBACH.

Witnesses:
    ERNEST H. WAY,
    WALTER S. BEAVER.